United States Patent
Luszcz et al.

(10) Patent No.: US 10,508,887 B2
(45) Date of Patent: Dec. 17, 2019

(54) ATTITUDE-COUPLED TARGETING SYSTEM FOR ROTARY WING AIRCRAFT

(71) Applicant: Sikorsky Aircraft Corporation, Stratford, CT (US)

(72) Inventors: Matthew T. Luszcz, Hamden, CT (US); David L. Adams, Wallingford, CT (US); Mark R. Alber, Milford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 288 days.

(21) Appl. No.: 15/601,235

(22) Filed: May 22, 2017

(65) Prior Publication Data

US 2017/0351270 A1  Dec. 7, 2017

Related U.S. Application Data

(60) Provisional application No. 62/344,533, filed on Jun. 2, 2016.

(51) Int. Cl.
| | |
|---|---|
| *G05D 1/00* | (2006.01) |
| *F41G 5/18* | (2006.01) |
| *B64C 29/00* | (2006.01) |
| *B64C 27/10* | (2006.01) |
| *B64C 27/82* | (2006.01) |
| *B64C 27/57* | (2006.01) |

(52) U.S. Cl.
CPC ............... *F41G 5/18* (2013.01); *B64C 27/10* (2013.01); *B64C 27/57* (2013.01); *B64C 27/82* (2013.01); *B64C 29/0033* (2013.01); *G05D 1/0094* (2013.01); *B64C 2027/8236* (2013.01)

(58) Field of Classification Search
CPC ......... F41G 5/18; B64C 13/503; B64C 27/10; B64C 27/82; B64C 29/0033; B64C 2027/8236; G05D 1/0094
USPC ............................................................ 701/3
See application file for complete search history.

(56) References Cited

U.S. PATENT DOCUMENTS

| | | | |
|---|---|---|---|
| 5,263,662 A | 11/1993 | Fowler et al. | |
| 5,310,135 A | 5/1994 | Fowler et al. | |
| 5,310,136 A | 5/1994 | Fowler et al. | |
| 5,331,881 A * | 7/1994 | Fowler ................ | F41G 3/22 |
| | | | 89/41.06 |
| 5,431,084 A | 7/1995 | Fowler et al. | |
| 5,465,212 A | 11/1995 | Fowler et al. | |
| 6,012,676 A * | 1/2000 | Gold .................. | G05D 1/0858 |
| | | | 244/17.13 |
| 6,145,428 A * | 11/2000 | Gold .................. | F41G 9/002 |
| | | | 244/17.13 |
| 2015/0367937 A1 | 12/2015 | Greenfield et al. | |

* cited by examiner

*Primary Examiner* — Gertrude Arthur Jeanglaude
(74) *Attorney, Agent, or Firm* — Cantor Colburn LLP (57) ABSTRACT

A flight control system for an aircraft includes a flight control computer operatively interconnected with a main rotor system and a translational thrust system of the aircraft. A selectively enabled integrated target and flight control system arranged in communication with the flight control computer. The integrated target flight and control system is configured to control pitch attitude and heading of the aircraft. When the integrated target and flight control system is enabled, at least partial operation of the aircraft is controlled in response to a pilot input via the flight control computer.

16 Claims, 5 Drawing Sheets

FIG. 5a  FIG. 5b ular, to an integrated target and flight control system for an aircraft where pitch attitude and heading are controlled independently from vehicle trajectory.
ATTITUDE-COUPLED TARGETING SYSTEM FOR ROTARY WING AIRCRAFT

CROSS-REFERENCE TO RELATED APPLICATIONS

This application claims the benefit of Provisional Application Ser. No. 62/344,533, filed Jun. 2, 2016, which is incorporated herein by reference in its entirety.

BACKGROUND

The subject matter disclosed herein generally relates to flight control systems for a rotary wing aircraft, and more particularly, to an integrated target and flight control system for an aircraft where pitch attitude and heading are controlled independently from vehicle trajectory.

Conventional rotary wing aircraft provide a unique orientation for a given configuration, weight, center of gravity, atmosphere, and speed. As a result, there is a single pitch attitude and bank angle required to sustain the trimmed, unaccelerated flight. A change in the aircraft attitude will cause the vehicle to accelerate in one or more directions. This can make it difficult to point the aircraft at a desired target or point of interest. To work around some of the limitations of the aircraft, more complicated systems, such as FLIR, sensor turrets, turreted weapons, and synthetic vision solutions are often utilized which increase complexity, cost, and weight.

Targeting systems, such as an integrated fire control and flight control (IFFC) systems, are often used to coordinate an aircraft's flight attitude with that required for accurate launching or firing of the aircraft's weapons. These integrated systems typically embody both an automated flight control function, which controls the aircraft's response in its yaw, pitch, roll and collective axes to the sensed state of the aircraft's flight dynamics, to provide stable aircraft response to pilot commanded maneuvers, as well as a fire control function which modifies the flight control commands under certain circumstances to provide optimum aircraft-to-target orientation for weapon launch. However, as a result of the automated flight control function, a pilot temporarily cedes some of their control over the aircraft trajectory to the automated systems when these systems are enabled. Since the original vehicle trajectory is altered by the flight control system prioritizing aircraft orientation for weapons release or aiming, the fire control function cannot be maintained indefinitely.

SUMMARY

According to one embodiment, a flight control system for an aircraft includes a flight control computer operatively interconnected with a main rotor system and a translational thrust system of the aircraft. A selectively enabled integrated target and flight control system arranged in communication with the flight control computer. The integrated target flight and control system is configured to control pitch attitude and heading of the aircraft. When the integrated target and flight control system is enabled, at least partial operation of the aircraft is controlled in response to a pilot input via the flight control computer.

In addition to one or more of the features described above, or as an alternative, further embodiments a trajectory of the aircraft is controlled in response to the pilot input when the integrated target and flight control system is enabled.

In addition to one or more of the features described above, or as an alternative, further embodiments at least one of roll axis, altitude, and longitudinal velocity is controlled in response to the pilot input when the integrated target and flight control system is enabled.

In addition to one or more of the features described above, or as an alternative, further embodiments the flight control computer controls at least one of roll, altitude, and longitudinal velocity of the aircraft in response to the at least one pilot input.

In addition to one or more of the features described above, or as an alternative, further embodiments during operation of the integrated target and flight control system, the attitude controlled by the integrated target and flight control system includes yaw attitude (heading) and pitch attitude.

In addition to one or more of the features described above, or as an alternative, further embodiments the flight control system further comprises target position/angle data inputs and a target control system configured to receive said target position/angle data inputs and provide target position data to said integrated target and flight control system.

In addition to one or more of the features described above, or as an alternative, further embodiments the flight control computer provides control surface command signals to an aircraft control surface of the main rotor system and the translational thrust system to control lift, propulsive thrust, yaw, pitch, and roll forces and moments of the aircraft in flight.

In addition to one or more of the features described above, or as an alternative, further embodiments the flight control system is a fly-by-wire system.

In addition to one or more of the features described above, or as an alternative, further embodiments the main rotor system comprises a dual, contra-rotating main rotor system and the translational thrust system comprises an auxiliary propulsor.

In addition to one or more of the features described above, or as an alternative, further embodiments wherein the aircraft is one of a tilt-wing aircraft and tilt-rotor aircraft.

According to another embodiment, a method of tracking a target with an aircraft having velocity and attitude controlled independently, the method includes identifying a target, enabling an integrated target and flight control system associated with a flight control computer of the aircraft, tracking the target, controlling at least one parameter of the aircraft in response to a command provided by the integrated target and flight control system, and controlling at least one parameter of the aircraft in response to a command provided by a pilot input.

In addition to one or more of the features described above, or as an alternative, further embodiments an orientation of the aircraft relative to the target is controlled in response to the integrated target and flight control system.

In addition to one or more of the features described above, or as an alternative, further embodiments a trajectory of the aircraft is controlled in response to the pilot input.

In addition to one or more of the features described above, or as an alternative, further embodiments at least one of roll, altitude, and longitudinal velocity of the aircraft in response to the pilot input.

In addition to one or more of the features described above, or as an alternative, further embodiments enabling the integrated target and flight control system occurs via a switch.

In addition to one or more of the features described above, or as an alternative, further embodiments the aircraft includes a movable turret and the movable turret is used for tracking the target.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION

Figure 1:
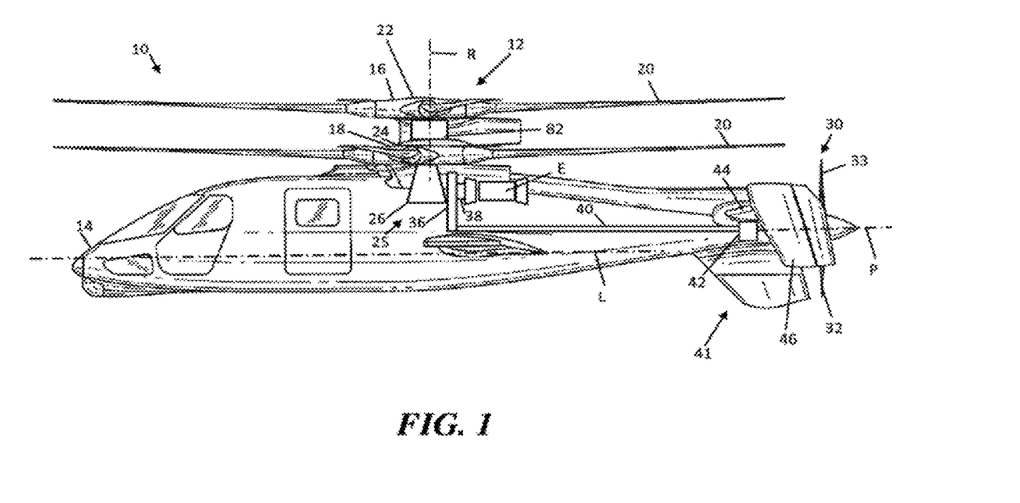
FIG. 1 is a side view of an example of a rotary wing aircraft with auxiliary propulsion.
Figure 2:
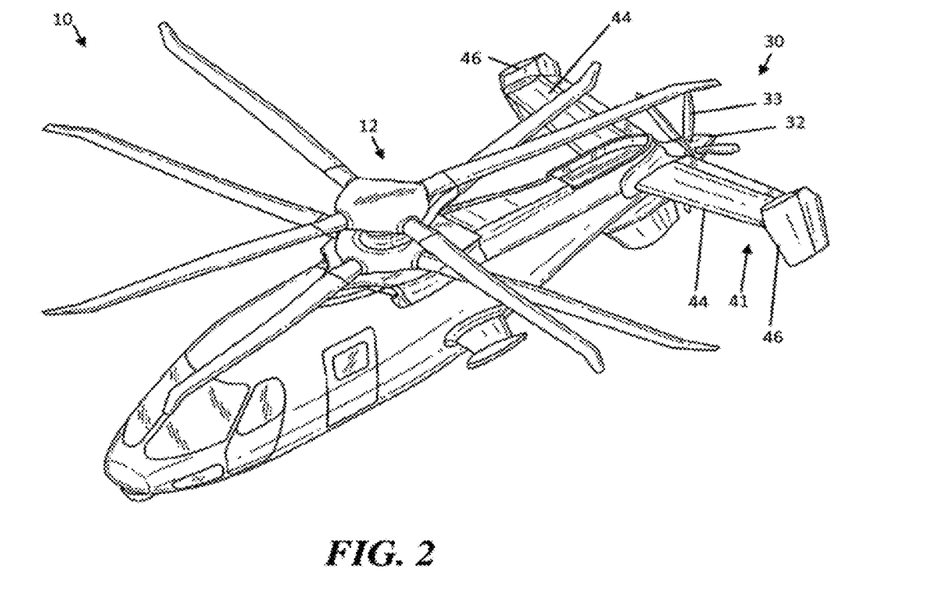
FIG. 2 is a perspective view of the example of a rotary wing aircraft of FIG. 1.

FIGS. 1 and 2 illustrate an example of a vertical takeoff and landing (VTOL), high speed compound or coaxial contra-rotating rigid rotor aircraft 10 having a dual, contra-rotating main rotor system 12, which rotates about a rotor axis of rotation R. The aircraft 10 includes an airframe 14 which supports the dual, contra-rotating, coaxial main rotor system 12 as well as a translational thrust system 30 which provides translational thrust generally parallel to an aircraft longitudinal axis L.

The main rotor system 12 includes an upper rotor system 16 and a lower rotor system 18 as dual contra-rotating main rotors in a coaxial configuration. A plurality of rotor blade assemblies 20 are mounted to a rotor hub 22, 24 of each rotor system 16, 18, respectively. A swashplate assembly 82 can enable control of the rotor blade assemblies 20 for pitch attitude control, as well as roll and collective control. The main rotor system 12 is driven by a transmission 25. The translational thrust system 30 may be any auxiliary thrust or propeller system including, but not limited to a pusher propeller, a tractor propeller, a nacelle mounted propeller, a ducted fan, directed thrust, etc. In the example of FIGS. 1-2, the translational thrust system 30 includes an auxiliary propulsor 32. In an embodiment, the auxiliary propulsor 32 is a pusher propeller system with a propeller rotational axis P oriented substantially horizontal and parallel to the aircraft longitudinal axis L to provide thrust for high speed and low speed flight. The translational thrust system 30 may be driven through a main gearbox 26 which also drives the main rotor system 12.

The transmission 25 includes the main gearbox 26 driven by one or more engines, illustrated schematically at E. The main gearbox 26 may be interposed between one or more gas turbine engines E, the main rotor system 12 and the translational thrust system 30. The transmission 25 may also include a combiner gearbox 36 in meshing engagement with the main gearbox 26 and driven by one or more engines E. The engines E may drive the combiner gearbox 36 and the main gearbox 26 through a disconnecting mechanism, such as an overrunning clutch 38. The translational thrust system 30 can include a drive shaft 40 which is driven by the combiner gearbox 36 to drive the auxiliary propulsor 32 through an auxiliary propulsor gearbox 42. Although a particular rotary wing aircraft configuration is illustrated and described in the disclosed non-limiting embodiment, other configurations and/or machines with rotor systems are within the scope of the present invention.

In the example of FIGS. 1 and 2, the auxiliary propulsor 32 includes a plurality of propeller blades 33 and is positioned at a tail section 41 of the aircraft 10. The tail section 41 includes active elevators 44 and active rudders 46 as controllable surfaces, as best seen in FIG. 2. During flight regimes, aircraft pitch attitude and longitudinal velocity demands (i.e., speed) can change independently. Exemplary embodiments control both the main rotor system 12 and the translational thrust system 30 to support a range of aircraft pitch attitudes over a range of aircraft airspeeds.

Figure 3:
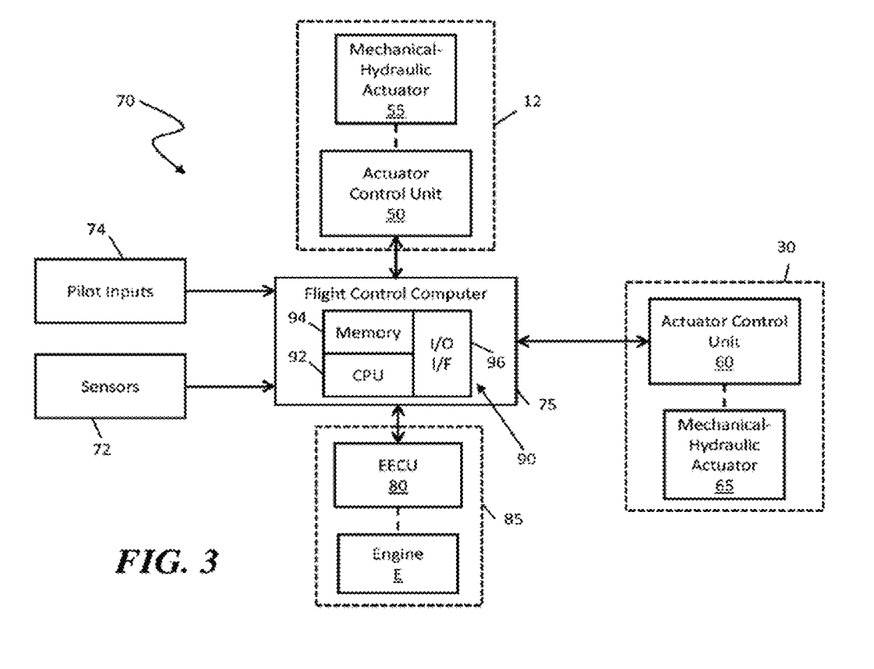
FIG. 3 is a schematic diagram of a flight control system according to an embodiment.

Portions of the aircraft 10, such as the main rotor system 12 and the translational thrust system 30 for example, are driven by a flight control system 70 illustrated in FIG. 3. In one embodiment, the flight control system 70 is a fly-by-wire (FBW) control system. In a FBW control system, there is no direct mechanical coupling between a pilot's controls and movable components or control surfaces such as rotor blade assemblies 20 or propeller blades 33 of the aircraft 10 of FIGS. 1 and 2. Instead of using mechanical linkages, a FBW control system includes a plurality of sensors 72 which can sense the position of controlled elements and generate electrical signals proportional to the sensed position. The sensors 72 may also be used directly and indirectly to provide a variety of aircraft state data to a flight control computer (FCC) 75. The FCC 75 may also receive pilot inputs 74 as control commands to control the lift, propulsive thrust, yaw, pitch, and roll forces and moments of the various control surfaces of the aircraft 10.

In response to inputs from the sensors 72 and pilot inputs 74, the FCC 75 transmits signals to various subsystems of the aircraft 10, such as the main rotor system 12 and the translational thrust system 30. The FCC 75 can use reference values in the pilot inputs 74 for feed forward control to quickly respond to changes in the reference values and can perform feedback control to reject disturbances detected via the sensors 72. Pilot inputs 74 can be in the form of stick commands and/or beeper commands to set and incrementally adjust reference values for controllers. The pilot inputs 74 need not be directly provided by a human pilot, but may be driven by an automatic pilot, a remote control, a navigation-based control, or one or more outer control loops configured to produce one or more values used to pilot the aircraft 10.

The main rotor system 12 can include an actuator control unit 50 configured to receive commands from the FCC 75 to control one or more actuators 55, such as a mechanical-hydraulic actuator, for the rotor blade assemblies 20 of FIGS. 1 and 2. In an embodiment, pilot inputs 74 including cyclic and/or collective commands may result in the actuator control unit 50 driving the one or more actuators 55 to adjust the swashplate assembly 82 of FIG. 1 to control the rotor blade assemblies 20 of FIGS. 1 and 2. Alternatively, the FCC 75 can directly control the one or more actuators 55, and the actuator control unit 50 can be omitted.

The translational thrust system 30 can include an actuator control unit 60 configured to receive commands from the FCC 75 to control one or more actuators 65, such as a mechanical-hydraulic actuator, for the propeller blades 33 of FIGS. 1 and 2. In an embodiment, pilot inputs 74 include a propeller pitch command for the actuator control unit 60 to drive the one or more actuators 65 for controlling the propeller blades 33 of FIGS. 1 and 2. Alternatively, the FCC 75 can directly control the one or more actuators 65, and the actuator control unit 60 can be omitted.

The FCC 75 can also interface with an engine control system 85 including one or more electronic engine control units (EECUs) 80 to control the engines E. Each EECU 80 may be a digital electronic control unit such as Full Authority Digital Engine Control (FADEC) electronically interconnected, to a corresponding engine E. Each engine E may include one or more instances of the EECU 80 to control engine output and performance. Engines E may be commanded in response to the pilot inputs 74, such as a throttle command.

Rather than simply passing pilot inputs 74 through to various control units 50, 60, and 80, the FCC 75 includes a processing system 90 that applies models and control laws to augment commands. The processing system 90 includes processing circuitry 92, memory 94, and an input/output (I/O) interface 96. The processing circuitry 92 can be any type or combination of computer processors, such as a microprocessor, microcontroller, digital signal processor, application specific integrated circuit, programmable logic device, and/or field programmable gate array, and is generally referred to as central processing unit (CPU) 92. The memory 94 can include volatile and non-volatile memory, such as random access memory (RAM), read only memory (ROM), or other electronic, optical, magnetic, or any other computer readable storage medium onto which data and control logic as described herein are stored. Therefore, the memory 94 is a tangible storage medium where instructions executable by the processing circuitry 92 are embodied in a non-transitory form. The I/O interface 96 can include a variety of input interfaces, output interfaces, communication interfaces and support circuitry to acquire data from the sensors 72, pilot inputs 74, and other sources (not depicted) and may communicate with the control units 50, 60, 80, and other subsystems (not depicted).

In an embodiment, the flight control computer 75 is configured to provide independent speed and pitch attitude control of a rotary wing aircraft 10. An example of a configuration of the flight control system 70 that allows for independent speed and pitch attitude control is described in U.S. patent application Ser. No. 14/741,793 filed on Jun. 17, 2015, the entire contents of which is incorporated herein by reference. Although this independent control of velocity and pitch attitude is described with respect to an aircraft having a contra-rotating coaxial main rotor 12 and an auxiliary propulsor 32, other types of aircraft, such as a thrust compound aircraft, a tilt-wing aircraft, and a tilt-rotor aircraft are within the scope of the disclosure.

Figure 4:
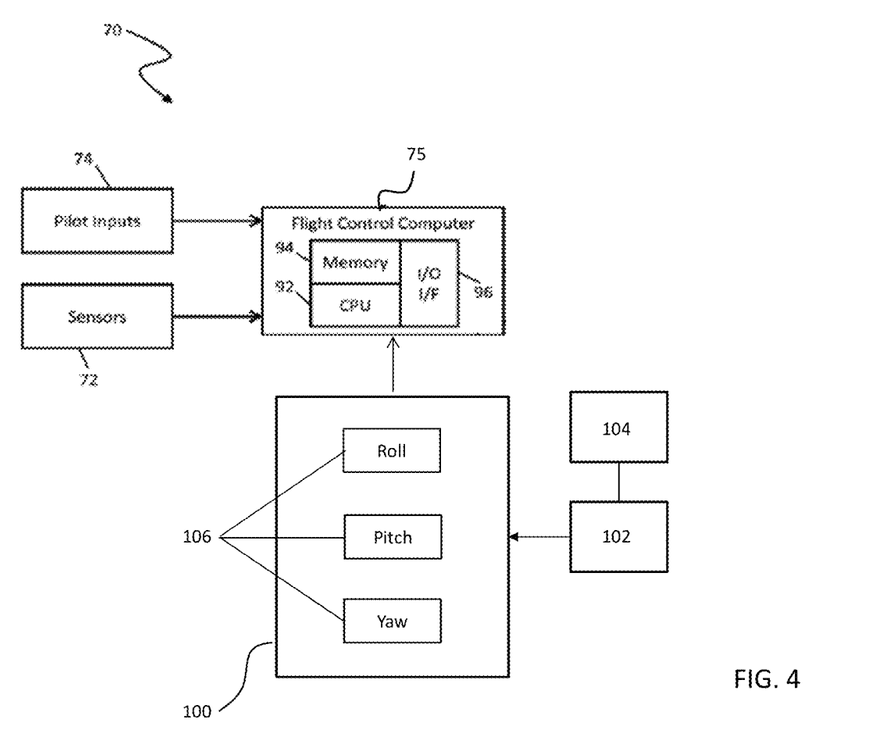
FIG. 4 is a schematic diagram of an integrated target and flight control system according to an embodiment.

With reference now to FIG. 4, the flight control system 70 can also interface with an integrated target and flight control system (ITFC) 100 to track and/or fire at target, such as with a turreted gun 110 (see FIG. 5) for example. While the ITFC 100 is illustrated and described herein with respect to a weapon system, it should be understood that the ITFC may be used in a variety of other applications, including but not limited to search radar systems, reconnaissance, traffic monitoring, and search and rescue for example. The ITFC 100 includes a target control system 102. Target position data is provided to the target control system 102 from target position/angle data inputs, illustrated schematically at 104.

The target position/angle data inputs 104 may be provided from a variety of sources, including but not limited to a fire control computer, a search radar, a FLIR-like system, line of sight sensors, map and position data, infrared sensors, laser sensors, and radar sensors for example. Target control data from the target control system 102 and sensed parameter signals measured by sensors 72 are provided to the ITFC 100. Examples of sensors 72 include a camera system, a forward looking infrared radar sensor, a laser designator, and thermal imager for example. In an embodiment, one or more of the sensors 72 are located in a movable turret 110, in a forward area of the vehicle.

The ITFC 100 contains control channel modules 106 for providing one or more control signals, such as yaw, pitch, and roll for example, to the flight control computer 75. Normally, in response to pilot commands generated via pilot inputs 74, the FCC 75 provides the desired yaw and pitch attitude reference. The difference between these attitude reference commands and actual aircraft attitude are attitude feedback error signals and the FCC 75 is continuously attempting to reduce these to zero. When the ITFC 100 is enabled, azimuth and elevation references are provided to the FCC 75 where they are transformed into rate and attitude references. These rate and attitude references drive the feedback loops and provide vehicle tracking information to targeting references. This is referred to as the "coupled aiming" mode of operation. ITFC 100 may be selectively enabled by the pilot via a switch on a pilot input, such as a sidearm controller for example, or additional logic may be provided which requires that the target control system 102 provides valid target control commands. Further detail of an "coupled aiming" mode of an aircraft is described in U.S. patent application Ser. No. 07/967,308 filed on Oct. 28, 1992, the entire contents of which is incorporated herein by reference.

Typically, when the ITFC 100 is engaged, the ITFC 100 will cooperate with the flight control system 70 to control operation of the rotary wing aircraft 10 to maintain the orientation and position of the aircraft 10 relative to a target. As a result, no pilot inputs are required to fly the aircraft 10 when the ITFC 100 is engaged. However, when the ITFC 100 is applied to an aircraft 10 where longitudinal velocity is controlled independently of pitch attitude as described above, at least partial operation of the aircraft 10 will remain under direct pilot control when the ITFC 100 is active. As a result, operation of the aircraft can be adapted to utilize the aircraft itself as a turreted platform.

In an embodiment, the ITFC 100 is configured to control the pitch and heading commands (pitch and yaw axes) of the aircraft 10 within specified operational limits in response to the aircraft state and targeting information, such as range, relative elevation, and azimuth to a target for example, provided by the target control system 102. At least one of the roll axis, altitude, and longitudinal velocity of the aircraft 10 remains independently controllable by a pilot via the pilot inputs 74. As a result, the pilot retains the ability to control the trajectory of the aircraft 10 even when the ITFC 100 is operational.

In another embodiment, when the ITFC 100 is enabled, the control strategy of the pilot may allow a translational rate command (TRC) to be input via a cyclic control and an altitude command/hold via the collective control. In response to the TRC command, the FCC will generate a velocity command in at least one of the longitudinal and lateral axes, proportional to the magnitude of the displacement of the pilot input 74. The pitch attitude command generated by the ITFC 100 and the velocity command resulting from the pilot inputs 74 are implemented via a combination of the main rotor system 12 and the auxiliary propulsor 32. In such embodiments, the commanded velocity could be zero with position hold implemented, or the commanded velocity could be offset to a steady non-zero command controlled by the pilot.

In addition, shared flight control between the ITFC 100 and the pilot may be useful to support aerial refueling of the aircraft 10. When a refueling probe extending from a tanker is selected as the target, the ITFC 100 will control the orientation of the aircraft 10 relative to the refueling probe such that the pilot is only responsible for controlling the velocity of the aircraft.

Figure 5:
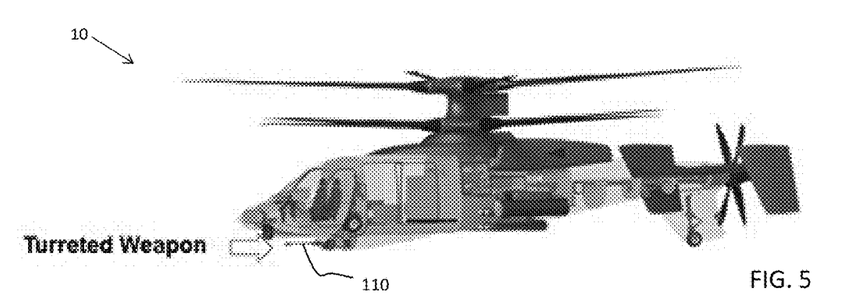
FIG. 5 is a side view of an example of a rotary wing aircraft with auxiliary propulsion including a turreted weapon according to an embodiment.
Figure 5A:
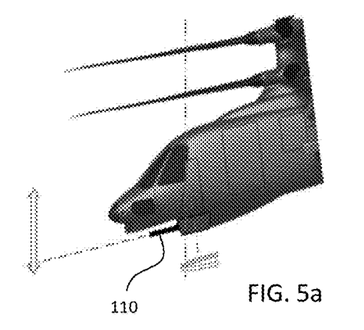
FIGS. 5a and 5b are side and front views of the rotary wing aircraft of FIG. 5 according to an embodiment.
Figure 5B:
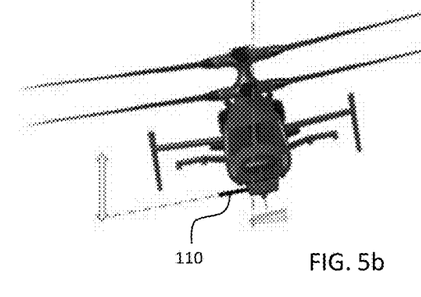

The ITFC 100 may be used to keep the aircraft in an orientation pointed at a moving or fixed target, while remaining in a fixed position with automated hover hold and altitude hold modes implemented by the FCC 90. With this implementation, the aircraft 10 is configured to operate in a manner similar to a fixed in-air turret, with minimal pilot input required. With reference now to FIG. 5, as a result of this increased functionality due to the independent control of velocity and pitch attitude, movement of the aircraft may be used to provide a portion of the movement of the turret. For example, movement of the nose of the aircraft vertically up and down (FIG. 5*a*) can provide elevation capability when the chute of the turreted system 110 is pointed forward. Similarly, left and right roll (FIG. 5*b*) can provide elevation capability when the chute is positioned laterally. This elevation capability provided by the aircraft 10 eliminates or reduces the need for the elevation features of the turret 110, allowing for a simplified turret 110 having a reduced size, weight, and drag.

The ability to slave the aircraft pitch attitude and heading commands to the ITFC 100, without affecting the trajectory of the aircraft 10, enables simpler targeting systems that do not require turret systems or turret controls. As a result, this weight and drag of the aircraft may be reduced while maintaining the same level of accuracy and usability provided on aircraft having turreted systems. Alternatively, turreted systems may have reduced requirements for the range of elevation and azimuth required to achieve the desired mission effectiveness. By slaving a portion of the aircraft control to the ITFC 100, the pilot field of view of a desired target may be improved without requiring complex synthetic visions systems and while maintaining full and independent control of the aircraft trajectory.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

What is claimed is:

1. A flight control system for an aircraft, comprising:
    a flight control computer operatively interconnected with a main rotor system and a translational thrust system of the aircraft; and
    an integrated target and flight control system arranged in communication with the flight control computer, the integrated target flight and control system being operable to control pitch attitude and heading of the aircraft, wherein when operation of the integrated target and flight control system is enabled, at least one operation of the aircraft is controlled in response to a pilot input via the flight control computer.

2. The flight control system according to claim 1, wherein a trajectory of the aircraft is controlled in response to the pilot input when the integrated target and flight control system is enabled.

3. The flight control system according to claim 1, wherein at least one of roll axis, altitude, and longitudinal velocity is controlled in response to the pilot input when the integrated target and flight control system is enabled.

4. The flight control system according to claim 3, wherein the flight control computer controls at least one of roll, altitude, and longitudinal velocity of the aircraft in response to the at least one pilot input.

5. The flight control system according to claim 1, wherein during operation of the integrated target and flight control system, the attitude controlled by the integrated target and flight control system includes yaw attitude (heading) and pitch attitude.

6. The flight control system according to claim 5, wherein the flight control system further comprises:
    target position/angle data inputs; and
    a target control system operable to receive said target position/angle data inputs and provide target position data to said integrated target and flight control system.

7. The flight control system according to claim 1, wherein the flight control computer provides control surface command signals to an aircraft control surface of the main rotor system and the translational thrust system to control lift, propulsive thrust, yaw, pitch, and roll forces and moments of the aircraft in flight.

8. The flight control system according to claim 1, wherein the flight control system is a fly-by-wire system.

9. The flight control system according to claim 1, wherein the main rotor system comprises a dual, contra-rotating main rotor system and the translational thrust system comprises an auxiliary propulsor.

10. The flight control system according to claim 1, wherein the aircraft is one of a tilt-wing aircraft and tilt-rotor aircraft.

11. A method of tracking a target with an aircraft having velocity and attitude controlled independently, the method comprising:
    identifying a target;
    enabling operation of an integrated target and flight control system associated with a flight control computer of the aircraft;
    tracking the target; and
    controlling a first operational parameter of the aircraft in response to a command provided by the integrated target and flight control system; and
    controlling a second operational parameter of the aircraft in response to a command provided by a pilot input.

12. The method according to claim 11, wherein an orientation of the aircraft relative to the target is controlled in response to the integrated target and flight control system.

13. The method according to claim 11, wherein a trajectory of the aircraft is controlled in response to the pilot input.

14. The method according to claim 13, wherein the second operational parameter includes at least one of roll, altitude, and longitudinal velocity of the.

15. The method according to claim 11, wherein enabling the integrated target and flight control system occurs via a switch.

16. The method according to claim 11, wherein the aircraft includes a movable turret and the movable turret is used for tracking the target.

* * * * *